United States Patent [19]

Prewo

[11] 4,265,968

[45] May 5, 1981

[54] HIGH STRENGTH, HIGH THERMALLY CONDUCTIVE ARTICLES

[75] Inventor: Karl M. Prewo, Vernon, Conn.

[73] Assignee: United Technologies Corporation, Hartford, Conn.

[21] Appl. No.: 135,375

[22] Filed: Mar. 28, 1980

Related U.S. Application Data

[63] Continuation-in-part of Ser. No. 54,084, Jul. 2, 1979, abandoned.

[51] Int. Cl.$^3$ ............................................. B32B 17/12
[52] U.S. Cl. ................................... 428/336; 428/334; 428/335; 428/367; 428/389; 428/390; 428/426; 428/428; 428/902
[58] Field of Search ............... 428/367, 408, 902, 389, 428/390, 428, 336, 335, 334, 426

[56] References Cited

U.S. PATENT DOCUMENTS

| | | | |
|---|---|---|---|
| 2,394,041 | 2/1946 | Conradty | 428/902 |
| 2,482,933 | 9/1949 | Queneau | 428/408 |
| 3,140,190 | 7/1964 | Lazzaro | 106/56 |
| 3,378,431 | 4/1968 | Smith | 106/52 |
| 3,431,970 | 3/1969 | Olstowski | 164/97 |
| 3,565,749 | 2/1971 | Wizon | 428/367 |
| 3,607,608 | 9/1971 | Siefert | 106/55 |
| 3,624,005 | 11/1971 | Godron | 252/506 |
| 3,627,551 | 12/1971 | Olstowski | 106/56 |
| 3,681,187 | 8/1972 | Bowen | 428/367 |
| 3,713,959 | 1/1973 | Rottmayer | 428/113 |
| 3,813,232 | 5/1974 | Forker | 65/23 |
| 3,964,924 | 6/1976 | Kurzeja | 428/408 |
| 3,977,294 | 8/1976 | Jahn | 428/408 |
| 4,055,697 | 10/1977 | Schmanshi | 428/367 |

FOREIGN PATENT DOCUMENTS 2257863 5/1973 Fed. Rep. of Germany ........... 428/408

OTHER PUBLICATIONS

Sambell et al., "Carbon Fiber Composites with Ceramic and Glass Matrices", *J. Mat. Science,* vol. 7, pp. 673-675 (1972).

Prewo, et al., "Glass Matrix Composites-I-Fiber Reinforced Glass", *Proceedings of the 2nd Intern. Conf. on Composite Material,* 4/1978.

Bacon et al., *Research on Graphite Reinforced Glass Matrix Composites,* NASA Contract Report 145245, Jun. 1977.

Bacon et al., *Research on Graphite Reinforced Glss Matrix Composites,* NASA Contract Report 158946, Jun. 1978.

*Primary Examiner*—Ellis P. Robinson
*Attorney, Agent, or Firm*—Harry J. Gwinnell

[57] ABSTRACT

Domestic cookware and laboratory and industrial processing apparatus are disclosed comprising graphite fibers in a glass matrix. The graphite is laid up in the glass matrix so as to produce a glass rich use or contact surface, which coupled with the materials selected provides versatility in article processing, high thermal conductivity and uniformity of heat distribution in the articles produced, chemical inertness, gas and liquid impermeability, and high impact resistance and flexural strength. The articles are produced by hot pressing a mixture of the fibers and glass in a mold at elevated temperture or by extrusion or pull-trusion processing. The high thermal conductivity of the articles of the present invention (e.g. in excess of 30 BTU inch hr$^{-1}$ ft$^{-2}$ °F.$^{-1}$) contributes to all of the above properties and makes the composites particularly useful as domestic cookware and laboratory and industrial processing apparatus.

5 Claims, 2 Drawing Figures

HIGH STRENGTH, HIGH THERMALLY CONDUCTIVE ARTICLES

BACKGROUND OF THE INVENTION

This application is a continuation-in-part of copending application Ser. No. 54,084, filed July 2, 1979 now abandoned.

1. Field of Art

The field of art to which this invention pertains is graphite fiber reinforced glass articles.

2. Description of the Prior Art

Both in domestic cookware and laboratory and industrial processing apparatus the use of glassware as a shaping medium is attractive because of the inherent design properties of a flowable material such as glass. However, because of the low impact resistance, low strength nad low thermal conductivity of many glass-containing composites such use for glassware has met with many restrictions. Additionally, even when such glassware is used in these areas its useful life is severely limited. Furthermore, glassware containers filled with substances to be processed suffer from thermal gradients so that "hot" and "cold" spots are common in this area. This nonuniform thermal processing is unacceptable for many purposes. Because of the ease of processability, resin material such as epoxy resins have been a popular composite component with graphite fibers for various industrial applications. However, epoxy and other resin material does suffer from stability problems at high temperatures and is reactive with many chemical substances. Accordingly, what is needed in the art is glass domestic cooking and laboratory and industrial processing apparatus which overcomes the many deficiencies of conventional articles in this area.

BRIEF SUMMARY OF THE INVENTION

The present invention is directed to glassware articles for containing material to be heated and cooled comprising graphite fibers laid up in a glass matrix forming a glassware article with high thermal conductivity in excess of 30 BTU inch $hr^{-1}$ $ft^{-2}$ $°F^{-1}$, uniformity of heat distribution, high thermal stability, high impact resistance, flexural strength, gas and liquid impermeability and chemical inertness. The articles are produced by hot pressing the mixture of fibers and glass in a mold at elevated temperatures or by extrusion or pull-trusion processes.

The foregoing and other objects, features and advantages of the present invention will become more apparent from the following description of preferred embodiments and accompanying drawings.

DETAILED DESCRIPTION OF THE PREFERRED EMBODIMENT

Figure 1:
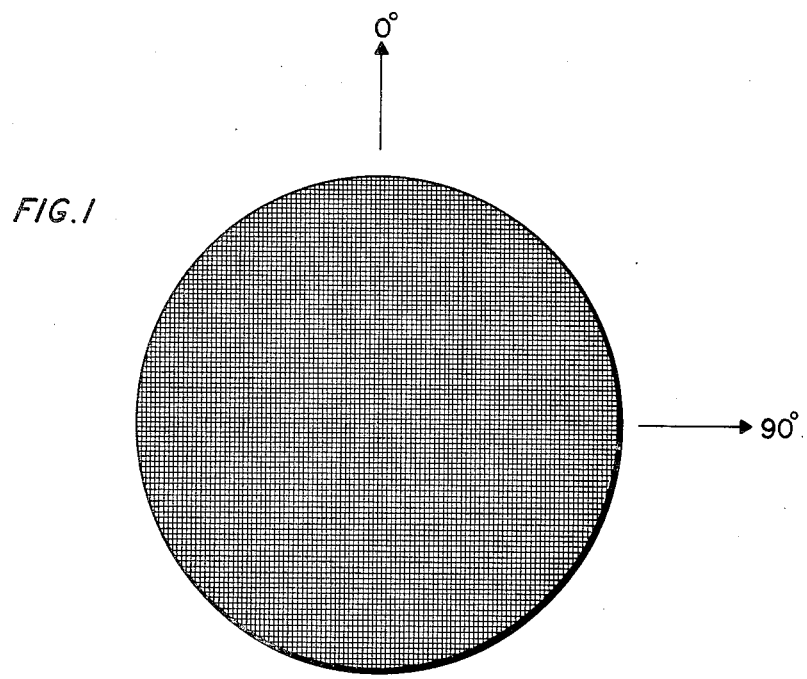
FIG. 1 demonstrates a typical 0°/90° cross-ply graphite fiber lay-up for articles of the present invention.

The articles contemplated by the present invention are of two types (1) industrial processing apparatus and (2) domestic cookware. Many similarities exist between the two classes of articles and their use may be interchangeable. For example, flasks, beakers and other storage and chemical reaction apparatus would desirably have the same high and low temperature properties as cookware of similar shape. This is also true of fluid conduits for conveying fluids subject to temperature extremes. Thus, when speaking of glassware articles for containing material to be heated or cooled included in this group are not only the industrial, laboratory and domestic articles mentioned, but fluid conduits such as tubes and pipes as well.

The two major components of the glassware of the present invention are graphite fiber and glass matrix material. The graphite fiber is selected for its high strength, high modulus of elasticity, and high thermal conductivity. The glass matrix is selected for its low coefficient of thermal expansion, preferably matched closely but not equal to that of the graphite fibers used, (because of the highly negative axial coefficient of thermal expansion of the graphite and the positive but small coefficient of thermal expansion of the glass), and its chemical inertness and thermal stability.

While any high strength graphite fiber with the requisite modulus of elasticity to produce a thermal conductivity greater than 30 BTU inch $hr^{-1}$ $ft^{-2}$ $°F^{-1}$ can be used to make the articles of the present invention, Celanese ® (Celanese Corp. of America) GY70 (formerly DG-102) graphite fibers are particularly suitable. The fiber is used at about 25 to 70% by volume based on the graphite-glass article and preferably in amounts at the lower end of the range, e.g., 25 to 40%.

The glass used is particularly selected to have a low coefficient of thermal expansion preferably matched as closely as possible to the graphite fibers used. Particularly suitable for the purposes of this invention is a borosilicate glass (C.G.W. 7740) with an anneal point of 560° C., a softening point of 821° C., a liquidus temperature of 1017° C., a density of 2.23 grams per cubic centimeter, an index of refraction of 1.474, a dielectric constant of 4.6, a coefficient of linear expansion of 32.5 cm/cm° C. $\times 10^{-7}$ and a modulus of elasticity of $9.1 \times 10^6$ psi. The particle size of the glass should be such that at least 90% passes through a 325 mesh screen.

As stated above, the composites of the present invention are particularly suitable for use in high temperature environments because of their high impact resistance, flexural strengths especially at high temperatures, and their uniformity of heat distribution. A key contributing factor to these properties is the high thermal conductivity of the composites. This high thermal conductivity makes the composites of the present invention particularly suitable for use in articles such as domestic cookware and laboratory and industrial processing apparatus. Surprisingly, it has been found that relatively small increases in the Young's modulus of the graphite fibers used in the composites of the present invention produce significant increases in the thermal conductivity of composites made according to the present invention. For example, thermal conductivity measurements for a composite made according to the present invention with graphite fiber having a Young's modulus of 350 GPa had a thermal conductivity of 15.5 BTU inch $hr^{-1}$ $ft^{-2}$ $°F^{-1}$. However, by increasing the Young's modulus of the fiber by 53% to 537 GPa, an increase of 100% in thermal conductivity was produced to 31.0 BTU inch $hr^{-1}$ $ft^{-2}$ $°F^{-1}$. And a further increase of 34% in the Young's modulus to 654 GPa produced an additional increase of 90% in composite thermal conductivity to 45.0 BTU inch $hr^{-1}$ $ft^{-2}$ $°F^{-1}$. Thermal conductivity of such significant level contributes substantially to the improved properties of the articles of the present invention.

The thermal conductivity measurements, e.g. as shown in Table I, were based on samples approximately 2.5 inches square, 0.2 inch thick, containing approximately 60% graphite fiber, measured in a direction transverse to the principal direction of fiber laying, i.e. perpendicular to the composite plane.

TABLE I

| Sample No. | Fiber Elastic Modulus (GPa) | % Increase in Fiber Elastic Modulus Over Sample No. 1 | Composite Flexural Properties | | Composite Thermal Conductivity (BTU inch hr$^{-1}$ ft$^{-2}$ °F.$^{-1}$) | % Increase in Composite Thermal Conductivity Over Sample No. 1 |
| --- | --- | --- | --- | --- | --- | --- |
| | | | Strength (MPa) | Modulus (GPa) | | |
| 1 | 350 | — | 620 | 180 | 15.5 | — |
| 2 | 537 | 53.4 | 432 | 275 | 31.0 | 100% |
| 3 | 654 | 86.9 | 683 | 332 | 45.0 | 190% |

The articles are preferably formed by laying up layers containing both graphite fiber and powdered glass. The articles formed are then hot pressed at elevated temperatures to form the composite. The processing parameters and composition of the material can vary widely, depending on the ultimate use of the article. And while the invention encompasses basically glassware articles with glass rich use or contact surfaces, in those instances where surface release properties or exceptional use surface strength is of prime importance, a graphite rich surface layer can be designed into the glass articles of the present invention by simply reversing the graphite fiber gradient at the use surface. In either case, the combination of the glass matrix and the gradient of graphite fibers produces the improved properties of the article as a whole as well as the optimum surface characteristics for the intended use. The gradient is produced by altering the relative percentages of graphite and glass in each layer.

It should be understood that by gradient producing a glass rich use surface is meant that the glass layers between the graphite fiber layers are not of the same thickness throughout the whole composite. For example, the thickness of the glass layers can be progressively greater towards the use surface. But an acceptable article can also be made by using glass layers of substantially the same thickness throughout the body of the composite as long as the last layer of glass representing the use surface is graded so as to have a final thickness after processing of at least approximately ½ mil. Such gradient produces both gas and liquid impermeability and chemical inertness.

A variety of methods can be used to produce the articles of the present invention, e.g., methods conventionally used to process glassware articles. However, even greater flexibility in processing is permitted with aticles of the present invention because of the superior fracture toughness and thermal conductivity of such articles. For example, sheets of the carbon-fiber glass composition can be formed by alternatively laying the carbon fibers in three layers as described above, with the glass in between and surrounding the layers and hot pressing to form the composite. The formed composite can then be processed into the desired form by die molding the desired sheet at, e.g., 1200° C. The forming step can include deforming to the shape of a beaker or pot, or rolling to the form of a pipe or other conduit shape. Alternatively the fibers and glass could simply be laid in a mold of the desired shape prior to molding. And pipe or other conduit forms of the material of the present invention can also be formed by pull-trusion, i.e., pulling the graphite plus glass through a forming die shaped to form a conduit. Unidirectional lay-ups of the fibers along the length of the conduit are particularly adapted to the latter method.

A preferred method for forming the articles of the present invention is by hot pressing the mixture of graphite fibers and glass. This method gives particular design flexibility in orienting the gradient, and sheets formed by such method are particularly adapted to hot pressing into the desired shapes. An exemplary method comprises continuously unwinding a tow of graphite fibers from a spool at a moderate rate of speed and passing such fibers through a slip of powdered glass, solvent and plasticizer to impregnate the tow. The impregnated fibers are then rewound onto a larger rotating spool. An exemplary slip composition may be composed of 40 grams of powdered glass in 780 ml of propanol. An alternative composition may comprise 85 grams of the glass and 200 grams of propanol, 10 grams of polyvinyl alcohol and 5 drops (approximately 1 cc) of a wetting agent, Tergitol. The receiving drum is preferably run at 1 revolution per minute or linear speed of 5 feet per minute. Excess glass and solvent can be removed by pressing a squeegee against the drum as it winds. Preferably the ground glass is sized so that 90% of it passes through a 325 mesh sieve. The thus impregnated tape is then dried either at ambient temperature or with a radiant heating source to remove solvent.

Figure 2:
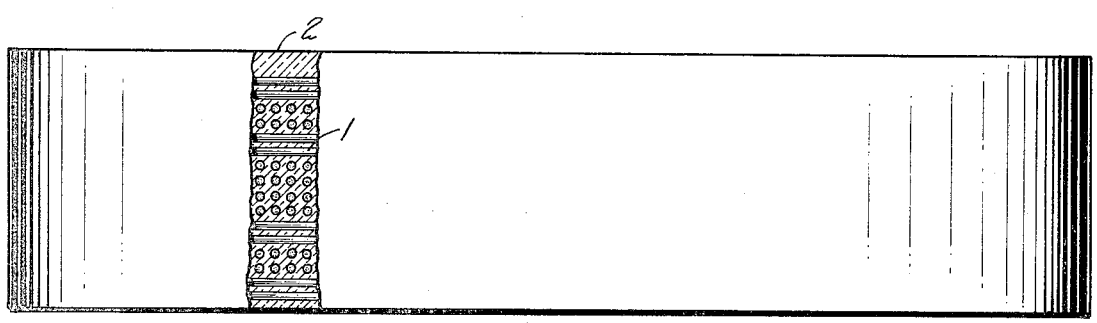
FIG. 2 demonstrates an end view (sectioned) of a hotpressed composite used to make articles of the present invention.

Following the impregnation the fiber is removed from the drum and cut into strips to confrom to the dimensions of the article to be fabricated. Th fibers are then preferably laid in alternating ply stack-up sequence of 0° and 90° as illustrated by FIGS. 1 and 2. In this particular example, demonstrated by FIG. 2, the graphite fibers 1 were laid increasing distance between the fiber lay-ups toward the use surface 2 to provide a glass-rich use surface, desirable, e.g., as a chemical reaction contact surface. The assembled composite is then hot pressed, either under vacuum or inert gas such as argon, in metal dies coated with colloidal boron nitride, or graphite dies sprayed with boron nitride powder, at pressures of 6.9 to 13.8 MPa (1000-2000 psi) and temperatures of 1050°-1450° C. Additional glass in the form of powder may also be inserted between each layer as it is laid if necessary to achieve the preferred 25-40% by volume loading of graphite fiber in the composite. Also, the mold can be vibrated to insure uniform distribution of the glass over the laid fiber surfaces.

While a 0° and 90° fiber lay-up has been used for illustration purposes, as demonstrated by FIG. 1, any multi-directional fiber lay-up may be used, such as 0°, 30°, 90° or 0°, 45°, 90°, etc. Unidirection fiber lay-ups may also be used and are particularly useful in a conduit-type article along its length.

While all of the properties resulting from the combination of graphite fibers and glass matrix as disclosed herein contribute to the improved glassware articles, including the high resistance to fracture, high strength and chemical inertness, the high thermal conductivity, high thermal stability, and uniformity of heat distribution make the articles of the present invention particularly attractive for industrial and domestic use over conventional articles of the prior art. For example, the thermal conductivity through a plane of a two-dimensional composite is clearly better than conventional epoxy resins and nearly twice that for the same composite using a conventional polyimide resin matrix rather than a glass matrix. Furthermore, even better thermal conductivity is achieved with the composites of the present invention than with conventional graphite-glass composites such as described in U.S. Pat. No. 3,681,187 which utilizes graphite fibers of significantly lower Young's modulus than that employed with the present invention.

Because of both the high and low temperature environment which the articles of the present invention will typically be used in, testing was performed between 300° K. and 1000° K. to demonstrate the composite strength and fracture toughness of the articles under adverse temperature conditions. In all cases, the articles were able to withstand high loads with increasing strain after initial fracture, and in all cases the articles remained substantially intact at the conclusion of testing. Note also FIG. 2 for a sectional end view of a typical composite of the present invention wherein 1 indicates the graphite fibers and 2 the glass matrix.

As demonstrated by the above, improved strength both hot and cold, including high modulus and flexural strength are key properties of the articles of the present invention. This is particularly important since such strength is maintained in spite of the rigorous thermal cycling such articles are subjected to, both in industrial and domestic environments. The high thermal conductivity coupled with lubricity, gas and liquid impermeability, chemical inertness and thermal stability allow for increased utility for the domestic and industrial apparatus of the present invention. For example, vessels for containing materials to be hot processed such as beakers, flasks, reaction vessels, casserole dishes, fry pans or skillets, and baking dishes can be used for almost limitless food and chemical processing. Also conduit equipment such as heat exchangers, and fluid conduits have particular versatility. And in view of the ease of fabrication of the material of the present invention, plumbing-type connectors and valves are also within the scope of the articles capable of being formulated under the present invention.

It is quite surprising that two brittle materials such as graphite and glass can produce in combination such fracture tough, thermally stable articles. For example, in general all glass articles during formation have to be cooled slowly to avoid cracking. However, articles of the present invention have such a high degree of fracture toughness that such slow cooling is not necessary. Furthermore, because of the high thermal conductivity of such articles, cooling takes place not only much more uniformly, but much more quickly as well. And the high fracture toughness of articles of the present invention allow machining to almost any desired shape. The presence of the fibers inhibits microcrack formation during machining and during use.

Although this invention has been shown and described with respect to a preferred embodiment, it will be understood by those skilled in this art that various changes in form and detail thereof may be made without departing from the spirit and scope of the claimed invention.

Having thus described a typical embodiment of my invention, that which I claim as new and desire to secure by Letters Patent of the United States is:

1. A glassware article for containing material to be heated and cooled comprising a graphite fiber reinforced low coefficient of thermal expansion glass matrix having a thermal conductivity at 25° C. of 45 BTU inch $hr^{-1}$ $ft^{-2}$ $°F^{-1}$, high flexural strength and modulus of elasticity.

2. The glassware article of claim 1 having a three-point flexural strength of at least 190 MPa at temperatures in excess of 150° K.

3. The glassware article of claims 1 or 2 comprising 25 to 70% by volume graphite.

4. The glassware article of claim 3 comprising approximately 60% by volume graphite.

5. The glassware article of claim 1 having a layer of glass at the use surface at least ½ mil thick.

* * * * *